Figure 5:
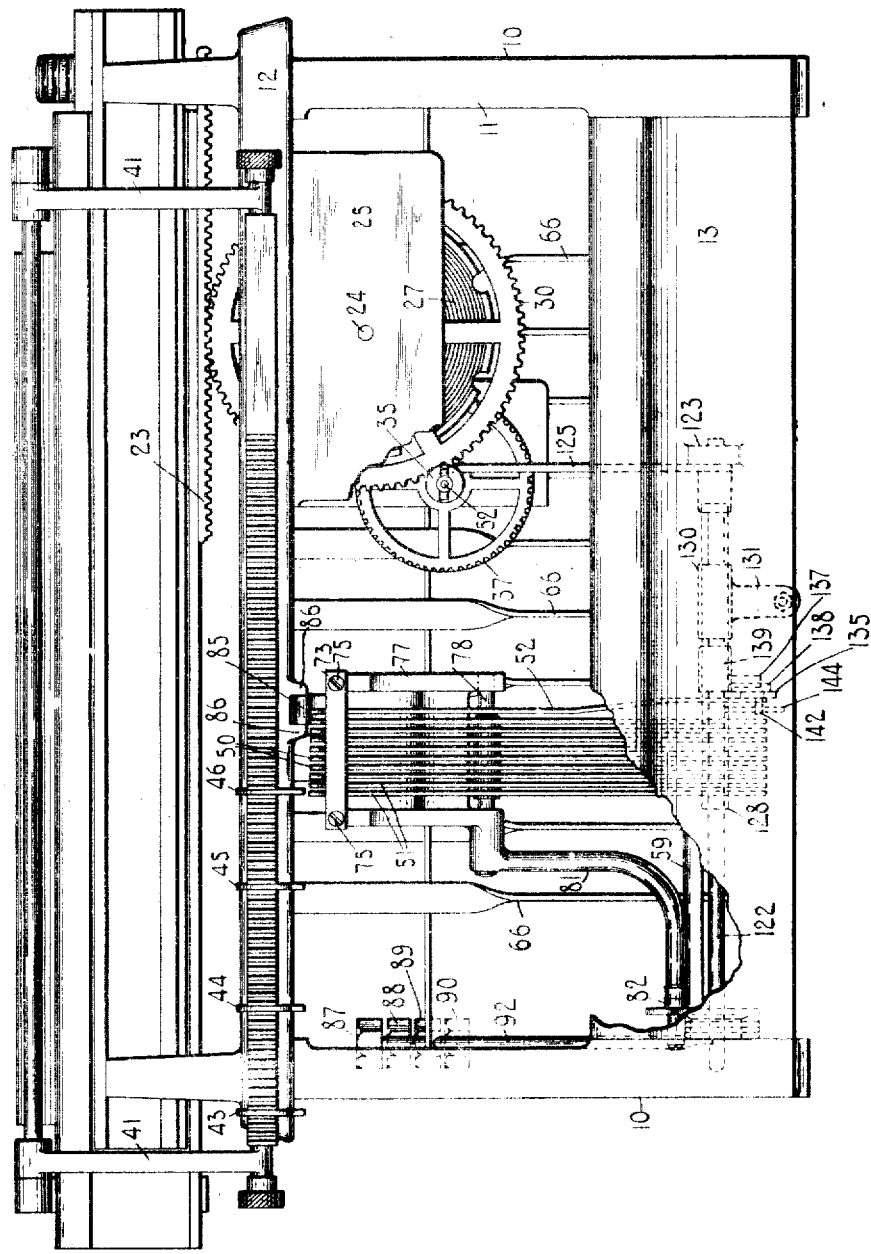

H. C. FORD.
TYPE WRITING MACHINE.
APPLICATION FILED MAR. 28, 1908.

945,159.

Patented Jan. 4, 1910.
6 SHEETS—SHEET 1.

FIG. 1.

FIG. 2.

WITNESSES:
J. B. Reeves
R. H. Strother

INVENTOR.
Hannibal C. Ford
BY Jacos Felbel
ATTORNEY.

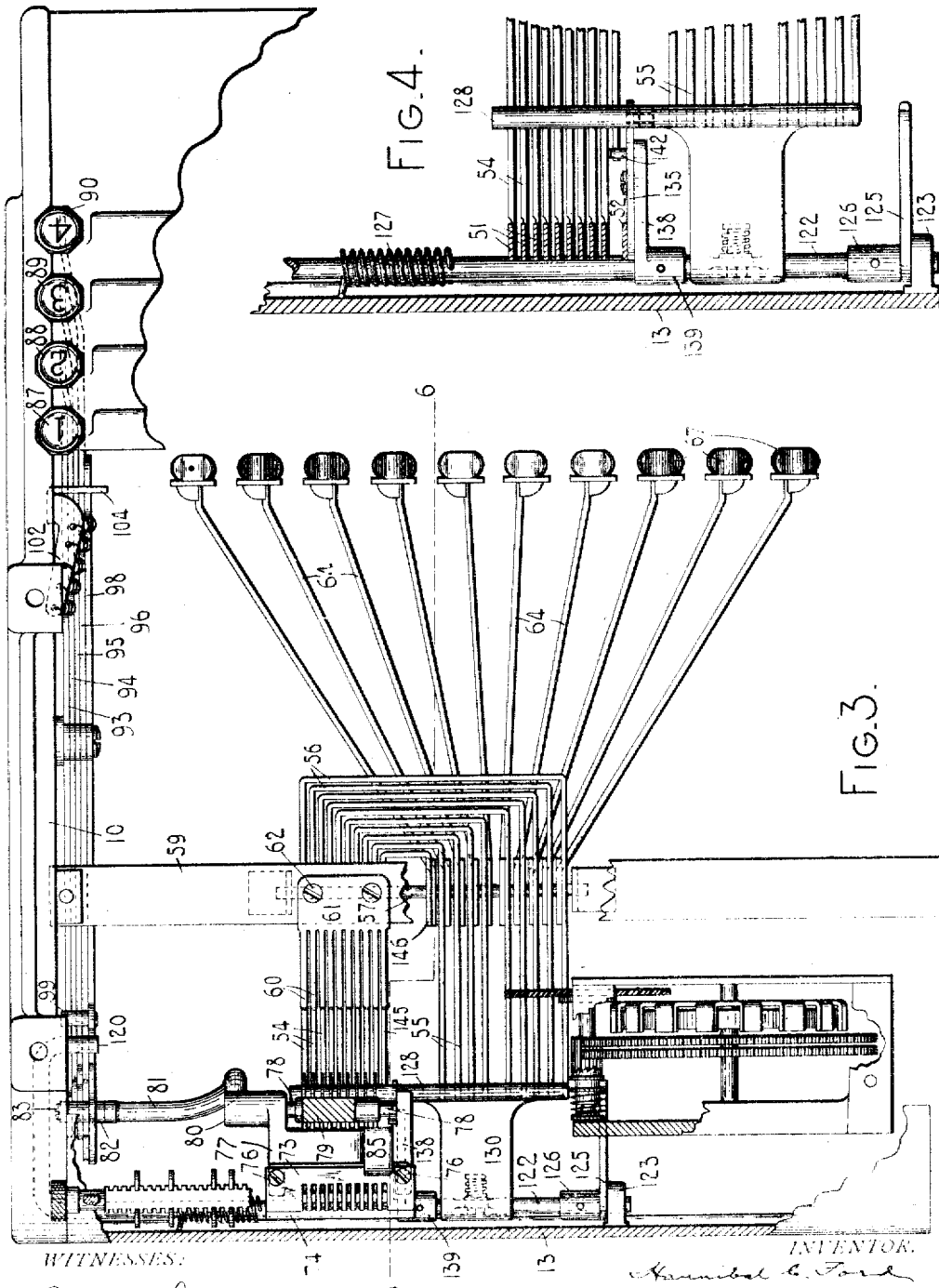

H. C. FORD.
TYPE WRITING MACHINE.
APPLICATION FILED MAR. 28, 1908.

945,159.

Patented Jan. 4, 1910.
6 SHEETS—SHEET 3.

WITNESSES:
J. B. Reeves
R. H. Strother

INVENTOR.
Hannibal C. Ford
BY Jacob Felbel
ATTORNEY.

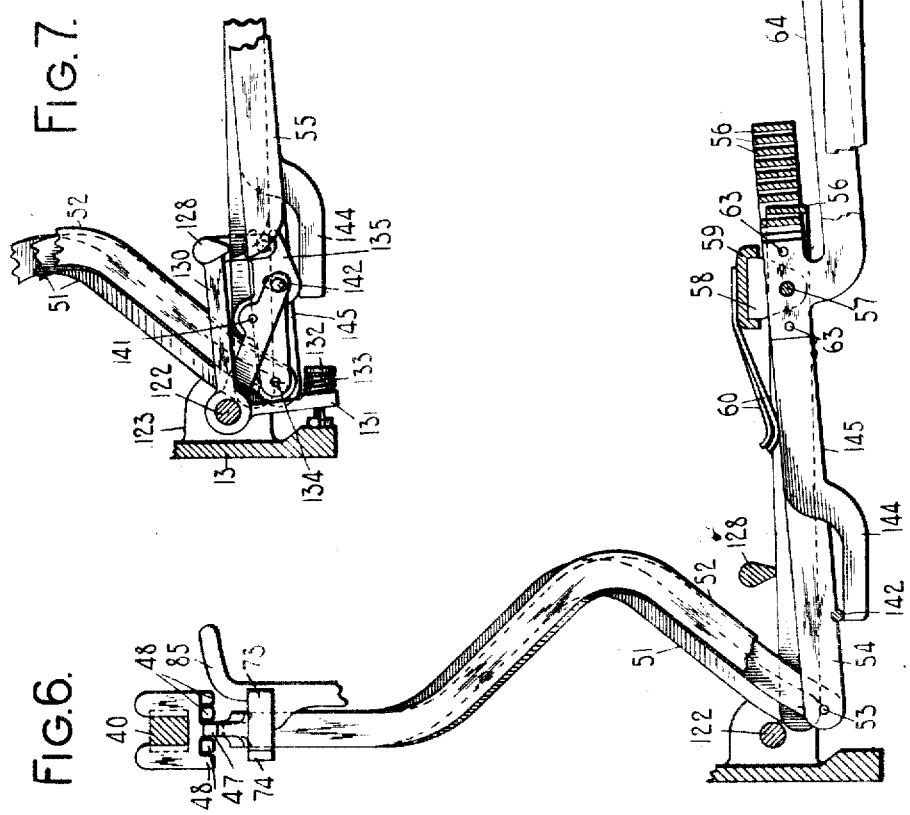

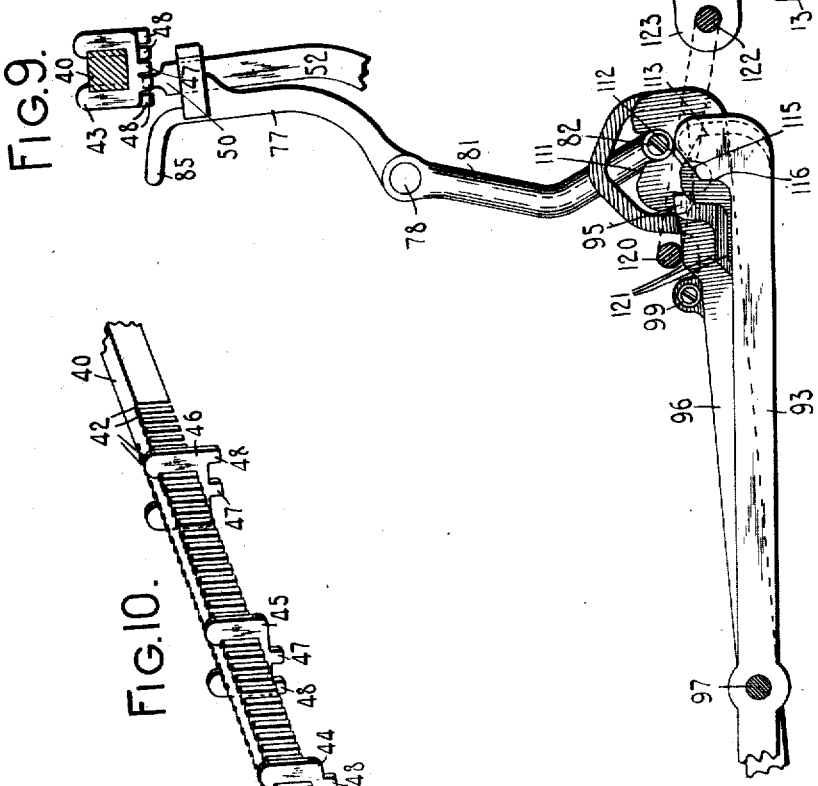

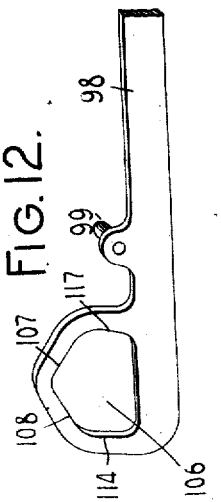
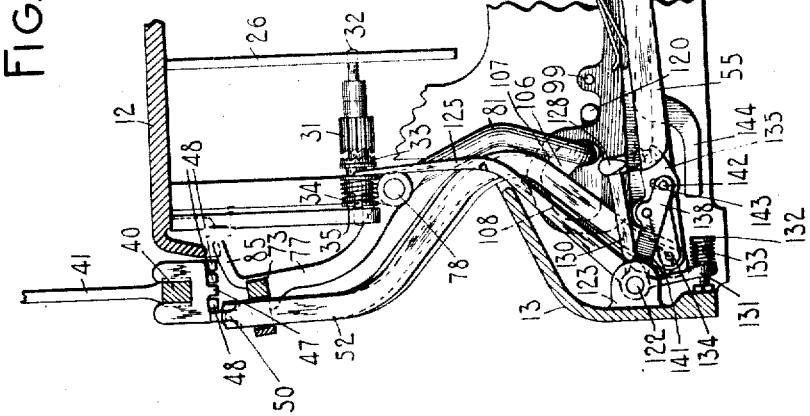

UNITED STATES PATENT OFFICE.

HANNIBAL C. FORD, OF SYRACUSE, NEW YORK, ASSIGNOR TO THE SMITH PREMIER TYPEWRITER COMPANY, OF SYRACUSE, NEW YORK, A CORPORATION OF NEW YORK.

TYPE-WRITING MACHINE.

945,159.  Specification of Letters Patent.  Patented Jan. 4, 1910.

Application filed March 28, 1908. Serial No. 423,916.

*To all whom it may concern:*

Be it known that I, HANNIBAL C. FORD, a citizen of the United States, and resident of Syracuse, in the county of Onondaga and State of New York, have invented certain new and useful Improvements in Type-Writing Machines, of which the following is a specification.

My invention relates to typewriting machines and more particularly to tabulator mechanism for such machines.

My invention has for its principal object to provide improved denominational tabulator mechanism and column selecting mechanism either of which may be operated separately or which may be operated simultaneously whereby the typewriter carriage may be brought by one continuous movement to any selected denominational position in any selected one of a plurality of columns without being arrested at any other column positions that may intervene between the starting position of the carriage and the position at which it is desired to arrest it.

Another object of my invention is to provide improved column selecting mechanism whereby the carriage may be brought by a continuous movement to any selected one of a plurality of column positions.

Other objects of the invention will appear in the course of the following description.

To the above ends, my invention consists in certain features of construction and combinations and arrangements of parts, all of which will be fully set forth herein and particularly pointed out in the claims.

One form of my invention is illustrated in the accompanying drawings, wherein the same reference character is used to designate the same parts in the several views.

Figure 1 is a front to rear vertical sectional view of parts of a typewriting machine having my invention embodied therein, the tabulator mechanism being shown in elevation. Fig. 2 is a detail side elevation of part of the mechanism, parts being shown in section. Fig. 3 is a top plan view of most of the parts shown in Fig. 1, but with parts shown in section and parts broken away and the top plate of the typewriter removed. Fig. 4 is a fragmentary plan view of part of the mechanism, partly in section. Fig. 5 is a rear elevation of a typewriting machine with my invention embodied therein, parts being omitted and parts broken away. Figs. 1 to 5 inclusive represent all parts in normal positions. Fig. 6 is a fragmentary vertical sectional view of part of the denominational tabulator mechanism, the section being taken on the line 6—6 of Fig. 3. Fig. 7 is a view similar to Fig. 2 but showing certain parts which are omitted in said Fig. 2. In Figs. 6 and 7 one of the decimal tabulator keys, namely the one corresponding to tens of dollars, is shown depressed, but the column selecting mechanism is in normal position. Fig. 8 is a left-hand side elevation of part of the mechanism, partly in section. Fig. 9 is a fragmentary right-hand side elevation of parts of the mechanism including the rear ends of the column selecting key levers and their connected parts. In Figs. 8 and 9 the parts are shown in the positions which they occupy when the column selecting key marked "4" is depressed. Fig. 10 is a perspective view of part of the column stop bar showing the adjustable column stops in position thereon. Fig. 11 is a fragmentary left-hand side elevation of the tabulator mechanism with parts of the typewriting machine shown in section and parts broken away. In this figure the first column selector key and one of the denominational tabulator keys are shown depressed simultaneously. Fig. 12 is a fragmentary perspective view of the rear end of a lever forming part of the column selecting mechanism. Figs. 13 and 14 are similar views of the rear ends of two of the column selecting key levers. Figs. 1, 3, 5 and 11 are on a reduced scale and the other views are full size.

My invention is applicable to typewriting machines generally but I have here shown it applied to that form of typewriting machine in which the key and type actions are stationary and in which the paper is carried by a carriage that moves back and forth across the machine; and more specifically, I have shown my invention applied to a front-strike typewriting machine.

The main frame of the machine shown in the drawings comprises side plates 10 having corner posts 11 integral therewith, and said corner posts support a top plate 12. The side plates 10 are connected together near the bottom of the machine by a back plate or frame piece 13 and at the front by a vertical plate 14 and an inclined keyboard plate 15. Standards 16, rising from the top plate, support a stationary carriage rail 17 which in turn supports a carriage 18 by means of anti-friction balls or rollers 19 running in suitable raceways formed in the rail 17 and in the carriage. The carriage 18 has mounted therein a platen 20 against the front face of which types mounted on front-strike type bars are adapted to strike in order to effect the printing on the paper. The type action as well as the paper feed devices and other appliances pertaining to this style of typewriting machine have been omitted from the drawings, as the particular construction of these devices forms no part of the present invention. The carriage may also have a suitable scale plate coöperating with a suitable pointer to indicate the different letter space positions to which said carriage may be moved, but these parts likewise are not shown in the drawings and, as far as my invention is concerned, they may be of any suitable construction.

The carriage is driven from right to left along the rail 17 and across the machine by means of a large toothed gear 22 which meshes with a broad rack 23 secured to the lower edge of the lower rail of the carriage. The gear 22 is mounted on a shaft 24 which is journaled at its ends in frame plates 25 and 26 depending from the top plate 12, and said gear 22 is driven by a spring 27 coiled within a spring drum 28 mounted on the shaft 24. A second gear wheel 30 meshes with the rack 23 and is loosely mounted on the shaft 24 by the side of the gear 22. The gear wheel 30 meshes with a pinion 31 (Fig. 1) which is mounted on a shaft 32 journaled in the frame plates 25 and 26, the pinion being mounted for rotation independently of the shaft but held against motion endwise of the shaft. As shown in Fig. 1, the rear face of the pinion 31 is formed with ratchet clutch teeth which mesh with corresponding teeth on a clutch member 33 slidably mounted on the shaft 32 but constrained to turn in unison with said shaft by splines 34 (Fig. 1) which slide in slots cut in a flange or enlargement 35 (Figs. 1 and 5) rigid with the shaft 32. The clutch 33 is pressed toward the front of the machine into engagement with the pinion 31, by a spring 36 (Fig. 1). The construction is such that the shaft 32 normally turns with the pinion 31, being connected therewith by the clutch 33, but said pinion may be freed from the shaft by moving the clutch 33 toward the rear of the machine, thus leaving the carriage free to be moved in either direction without turning the shaft 32. Said shaft 32 may be controlled by any suitable carriage escapement mechanism, which mechanism, however, is not shown in the present instance. As shown in the drawings, this shaft has rigidly secured thereto a gear wheel 37 having spiral teeth which are designed to drive a small pinion having an escapement wheel thereon in the manner set forth in the pending application of Alexander T. Brown, Serial No. 347,104, filed December 10, 1906.

The tabulator mechanism comprises a column stop bar 40 supported by two arms 41 depending from the upper part of the carriage 18 so that the bar 40 hangs down behind the top plate 12. Said bar 40 has in its front and rear faces a series of vertical slots 42 (Fig. 10), spaced a letter space distance apart, for the reception of U-shaped column stops 43, 44, 45 and 46. Each of these column stops or stop pieces has depending from its lower side two lugs which constitute the real column stops or stop portions of the stop pieces; that is to say, it is with these lugs that the key-controlled stops coöperate. Each of the column stop pieces has a stop lug 47 in the middle thereof or directly beneath the middle of the stop bar 40, and in addition each of these stop pieces has another lug 48 offset from the middle, no two of these stop lugs 48 being in line. One of the stop lugs 48 is a little behind and another is a little in front of the lug 47 of the corresponding stop piece; another is at the extreme rear, and another at the extreme front of its stop piece. All of the stop lugs 47 are in the same line so that they all traverse the same path when the carriage moves across the machine. A series of denomination stops 50 are mounted beneath the column stops 43—46, said denomination stops, except the one at the extreme left of the series, consisting of the upper ends of a series of upright bars 51, all of which are alike. The left-hand denomination stop 50 consists of the upper end of an upright bar 52, the lower part of which differs somewhat from the corresponding parts of the bars 51 and is differently connected up and operated. By an inspection of Fig. 1 it will be seen that if any one of the denomination stops 50 be moved directly upward it will be moved into the path of the stop lugs 47, whereas if any one of said stops be moved upward and at the same time be moved toward the front or the rear of the machine it will be brought into the path of one or another of the stop lugs 48, depending on the fore or aft position to which the denomination stop is moved. I have provided a set of denomination keys for moving any one of the stops 50 upward and a set of column keys or column selecting keys for moving the entire series or gang of denomination stops toward the front or back of the machine different distances so as to bring which ever one of said denomination stops is elevated, into the path of any selected one of the stop lugs 48.

Each of the upright bars 51 and 52 is bent forward and thence backward, as shown in Fig. 1, in order that said bar may pass in front of the back plate 13 of the stationary frame of the machine, which back plate, in the machine shown in the drawings, extends at its upper part at an inclination toward the front of the machine. As shown, for example, in Figs. 4 and 6 each of the bars 51 is pivoted at its lower end at 53 to the rear end of one of the arms 54 of a series of nested yoke frames or bails, which frames or bails consist of the arms 54 and arms 55 connected together by yoke pieces or bars 56. All of the arms 54 and 55 are pivoted on a rod 57 which is supported by brackets 58 secured to the under side of a frame bar 59, which at its ends is fastened to the side plates 10. These bails are held in their normal positions with their rearward extending arms depressed, by a series of spring tongues 60 projecting toward the rear of the machine from a plate 61 which is secured by screws 62 to the top of the cross bar 59. Each of the arms 55 of the bails has secured thereto by rivets 63 a lever arm 64 which extends toward the front of the machine and has pivoted thereto at its forward free end at 65 the stem 66 of a denomination key 67.

As shown in the drawings each of the arms 64 passes beneath the forward parts of the nested bails and at its rear end extends upward to the point where it is secured to the arm 55 of one of said bails; so that when one of the denomination keys is depressed as shown in Fig. 6 the corresponding yoke bar 56 may have its necessary downward motion without striking any of the lever arms 64 that have not been depressed. Said lever arms 64 fan outward toward the right and left, as best shown in Fig. 3, so as to bring the denomination keys 67 a suitable distance apart. It will be noted that the denomination stops are connected with the right-hand set of arms 54, whereas the keys are connected with the left-hand set of arms 55, so that the keys are in the reverse order of the stops. This brings the decimal key at the right of the series of keys and the key of highest denomination at the left of said series, which is the natural order of the keys. It will be perceived that each of the connections comprising a lever arm 64, arm 55, yoke bar 56 and arm 54, constitutes in effect a lever of the first order pivoted on the rod 57; so that when the denomination key is depressed the rear end 53 of the lever is elevated, lifting the denomination stop 50 into the path of the column stops. When the key is released it is restored to normal position by the corresponding spring 60.

The above description applies to all of the denomination keys except the key for the decimal point, the connections of which may be best understood in connection with the description of the column selecting mechanism. The upper parts of the stem 66 of all of the denomination keys, including that for the decimal point, are guided by two plates 70 and 71, the former of which is secured to the front edge of the top plate 12 and has formed therein a longitudinal rib 72 which guides the upper parts of the several key stems against motion toward the back of the machine. The plate 71 is formed at its upper and lower edges with flanges which are secured to the plate 70 and which flanges are formed with notches in which the several key stems are guided. The denomination keys are thus arranged in a transverse row at the back of the keyboard of the machine.

The column selecting mechanism comprises a guide piece or bar 73 for the upper ends of the stop bars 51 and 52, which guide piece is movable in a front and back direction in a manner, and by means, now to be described. As shown in Fig. 3 the guide piece 73 is in the nature of a comb plate having slots cut therein from its rear edge a letter space distance apart and having the bars 51 and 52 slidably guided in the slots thereof. Said slots are closed at their rear ends by a plate 74 secured to the bar 73 by screws 75 (Fig. 5). The comb plate 73 is secured by screws 76 (Fig. 3) to the upper part of a frame 77 which is pivoted on a rod 78 passing through and secured to a bracket 79 depending from the top plate 12. The rod 78 projects from the bracket 79 both in a left-hand and in a right-hand direction and the frame 77 is formed with two arms each of which is pivoted on one of the ends of said rod. At the right-hand end of the rod 78 the frame 77 is pivoted on said rod by a hub 80 of said frame, and an arm 81 projects from said hub downward and toward the right, the extreme lower right-hand end of said arm being horizontally disposed and having journaled thereon an elongated anti-friction roller 82 which is retained on its bearing by the head of a screw 83, threaded into the end of the arm 81. The construction is such that the comb plate 73 and, with it, the entire gang of bars 51 and 52, may be moved toward the front or back of the machine by rocking the frame 77 about its pivot 78, the bars 51 in this operation rocking about their pivots 53 and the bar 52 rocking about a pivot at its lower end, which pivot will be described later on.

When the carriage is arrested by any of the denomination stops the shock of arrest comes on the frame 77, and in order that this shock may be more advantageously taken by said frame, I provide an arm 85 on the upper part of said frame and projecting toward the front of the machine. As best shown in Fig. 5, this arm 85 moves in a groove between two lugs 86 depending from the top plate 12. The arm is free to move in a front and back direction in this groove but the lugs 86 prevent lateral motion of the arm 85 and, therefore, of the frame 77 when the stops come into contact. The arrangement just described also prevents motion of the frame 77 lengthwise of its pivot 78.

The frame 77 may be moved toward the front or back of the machine by any one of a series of column keys or column selecting keys 87, 88, 89 and 90; which keys, as shown in the drawings, are arranged one in front of another at the extreme right-hand side of the keyboard of the machine. Each of these keys is mounted on the upper end of a stem 92, said stems passing through suitable guide openings in the keyboard plate 15 and being pivoted at their lower ends to the forward ends respectively of a series of key levers 93, 94, 95 and 96, all of which are pivoted side by side on a pivot screw 97 threaded into the right-hand side plate 10 of the machine frame about midway of the lengths of the several key levers, which key levers, it will be seen, are of the first order. As shown in Fig. 3, the forward ends of these key levers, except the first, are bent to the right so as to bring all of the keys into a straight line fore and aft of the machine.

A fifth lever 98 is pivoted on the screw 97 by the side of the key levers, and, some distance to the rear of said pivot screw, the lever 98 has a pin 99 projecting therefrom over the tops of the key levers 93, 94, 95 and 96, this pin constituting a universal bar which is elevated whenever any of the column keys is depressed, the construction being such that whenever any of said keys is depressed its key lever is rocked about the screw 97 and the universal lever 98 is also rocked about said pivot screw.

Each of the levers 93, 94, 95, 96 and 98 is provided with a returning spring 101, these springs, as shown in the present instance, being coiled springs secured at their lower ends to the levers and at their upper ends to a bracket 102 which is secured by screws 103 to the side plate 1 of the machine. The bracket is here shown struck up out of sheet metal and having bent off therefrom an arm or bracket 104 that hangs down to the left of the forward end of the lever 98 and serves as a guide for the forward ends of the levers.

As best shown in Fig. 12, the lever 98 has at its rear end an opening 106 into which the anti-friction roller 82 of the arm 81 projects. The upper side of this opening 106 is of a blunt inverted V-shape, forming two cam edges 107 and 108. As the rear end of this lever is normally held down by its spring 101, these cam edges of the opening 106 act on the roller 82 to retain said roller normally in the middle of the opening considered in a front and back direction, with the result that the frame 77 is normally held in its middle position as shown in Fig. 1, in which position the denomination stops, if operated by a denomination key, will come into the paths of the stop lugs 47 of the column stops. It will thus be seen that if one of the denomination keys is depressed without depressing a column key, the carriage will be arrested by the first column stop that reaches the operated denomination stop so that the tabulator will work under these conditions as an ordinary denominational tabulator.

Each of the column selecting key levers is formed at its rear end with a cam adapted to move the roller 82 one way or the other from its middle position. This set of cams is shown in Fig. 9 and two of them are shown in detail in Figs. 13 and 14. As shown in Fig. 13 the key lever 96 has in its upper edge a notch 110 and a cam surface or edge 111. When this key lever is operated as shown in Fig. 9, the cam 111 moves the roller 82 a short distance toward the rear of the machine, after which said roller is engaged by the lever in the notch 110, whereby the roller is accurately positioned. The upper part of the frame 77 is thus moved toward the front of the machine, bringing the denomination stops 50 into such position that if one of said stops be elevated said stop will be brought into the path of the stop lug 48 of the column stop 43, which, in the arrangement shown, is the column stop at the extreme right of the series of column stops. When the parts are operated in this manner the stop 50 is not in the path of any of the other column stops so that the carriage will move to the fourth column position without being arrested at any intermediate column position. This fourth column key may be depressed simultaneously with any one of the denomination keys so that the carriage will move at once to the selected denominational position in the fourth column.

The key lever 95, which is connected with the third column key 89, is formed with the same sort of cam and notch as the key lever 96 except that the cam is reversed so as to move the roller 82 toward the front of the machine instead of toward the back of the machine. This will bring the denomination stops into position to arrest the third column stop 44 without arresting either of the two preceding column stops. The rear end of the key lever 94 is shown in Fig. 14 where it will be seen that the end of said lever is formed with a cam 112 and a vertical end 113. By an inspection of Fig. 9 it will be seen that if this key be operated the cam 112 will move the roller 82 toward the rear of the machine a greater distance than the lever 96. The lever 94 will in fact move the roller 82 toward the rear until it is arrested by the rear wall 114 (Fig. 12) of the opening 106 in the universal lever 98. In a similar fashion the lever 93 is formed at its end with a cam 113 (Fig. 9) and a forward vertical edge 116 so that if this lever be depressed the roller 82 will be moved to its extreme forward position until it is arrested by the front wall 117 (Fig. 12) of the opening 106. When any of the keys is operated its lever, through the pin 99, raises the rear end of the lever 98, thus moving the cams 107 and 108 away from the roller 82 and leaving said roller free to be moved by the cam on the rear end of the operated key lever. When the key is released it is returned to normal position by its spring 101 and the lever 98 is also restored to normal position by its spring 101, causing the cams 107 and 108 to restore the roller 82 and the gang of denomination stops to their normal central position.

In order to release the carriage from its escapement mechanism when any of the column selecting keys is depressed, a universal bar 120 is provided which overlies all of the column key levers just forward of their cam ends. It will be noted that all of these key levers are pivoted on the same axis but that the keys are not at the same distance from said axis so that the rear ends of these key levers will be elevated different distances, the key lever 96 being elevated the shortest distance and the key lever 93 the greatest distance when the keys are depressed. In order to compensate for this inequality in the motion of the levers and to cause all of said levers to impart the same extent of motion to the universal bar 120, the levers 94, 95 and 96, where they engage the universal bar 120, are formed with shoulders 121 suitably graduated in height as will be understood by an inspection of Fig. 9. The universal bar 120 consists of the end of a rod or shaft 122, the straight part of which is journaled in ears 123 projecting forward from the back plate 13 of the machine. At its right-hand end this shaft is bent toward the front of the machine forming an arm 124 and the free end of said arm is bent toward the left, forming the universal bar 120. Near the left-hand end of the rock shaft 122, an arm 125 is rigidly mounted on said rock shaft by means of a hub 126 (Fig. 3) and as best shown in Fig. 1 this arm extends forward and upward and at its upper end engages an annular groove formed in the clutch member 33. The construction is such that when any of the column selecting keys is depressed the arm 125 moves the clutch member 33 toward the rear of the machine, thus releasing the carriage from its escapement mechanism and allowing it to be drawn freely toward the left by its spring 27 until it is arrested by the tabulator. As shown in Fig. 4 the shaft 122 is provided with a returning spring 127 which is coiled around said shaft and is connected at one end to the shaft and at its other end presses against the back plate 13. The denominational tabulator is also provided with a universal bar 128 which, as shown in Fig. 4, overlies both the arms 54 and the arms 55 of the bails which are connected with the denomination keys. For reasons which will presently appear, this universal bar is not rigidly connected with the shaft 122 but is mounted on an arm 130 which at its rear end is pivoted on said shaft 122 so that the shaft can turn without elevating the universal bar 128. In order to prevent said universal bar from rising when the shaft 122 is rocked by one of the column key levers, a depending arm 131 is connected with the arm 130 and is formed at its lower end with an opening through which projects a headed screw 132 and a restoring spring 133 is compressed between the arm 131 and the head of said screw. When one of the denomination keys is operated the universal bar 128 is elevated and the arm 131 is moved toward the front of the machine, compressing the spring 133 as shown in Fig. 7.

The plunger bar 52 is so connected that when the right-hand decimal key 67, corresponding to the decimal point, is depressed, said bar 52 will be elevated to bring the stop 50 into operative position; and when any one of the column selecting keys is depressed without depressing a denomination key this bar 52 will also be elevated at the same time that the frame 77 is swung toward the front or back of the machine, so that the stop 50 at the upper end of this bar is the stop which is operated by the column keys; but when one of the denomination keys other than that for the decimal point is depressed simultaneously with one of the column selecting keys, the bar 50 is not raised to operative position. The lower end of the bar 52 is pivoted at 134 to the rear end of a floating lever 135 which, as best shown in Fig. 8, is formed at its forward end with an open-ended slot that embraces a pin 136 projecting from an arm 137 depending from the universal bar 128 of the denomination key levers. An arm 138 is rigidly mounted by means of its hub 139 on the rock shaft 122 and the floating lever 135 is pivoted about midway of the length thereof to said arm 138 by means of a pin or screw 141. Near its free end the arm 138 has a pin 142 which projects into a slot 143, this pin and slot connection permitting a limited oscillation of the lever 135 about its pivot 141. The pin 142 projects through the lever 135 into a position to be struck by the rear end 144 of the right-hand arm 145 of the innermost one of the nested bails or yoke frames constituting part of the denominational key lever system and which bail is connected with the denomination key corresponding to the decimal point. The lefthand arm 146 of this bail is not long enough to reach the universal bar 128 and the arm 145 as shown in Fig. 6 is so formed as not to operate said universal bar.

The operation of these parts is as follows:—When the denomination key for the decimal point is depressed, the arm 144, striking the pin 142, raises the arm 138, thus rocking the rock shaft 122, and moving the pivot 141 of the floating lever 135 upward, rocking said floating lever about the pin 136 as a center, the universal bar 128 being held down at this time by the spring 133. The lever 135 rocking about the pin 136 as described, raises the bar 52, bringing its stop 50 into the path of the stop lugs 47. When one of the column selecting keys is depressed without operating a denomination key the rock shaft 122 is rocked by the column key acting on the universal bar 120. The arm 138 rocks with the rock shaft 122 and the pin 141 operates the floating lever 135 as before, raising the bar 52 to bring its stop 50 into operative position at the same time that the frame 77 is rocked one way or the other by the column key. When a column key and a denomination key other than the decimal point key are operated simultaneously, the rock shaft 122 is rocked by the universal bar 120 but in this operation the universal bar 128 is also elevated and the pin 136 moves upward with it. The pin 136 and the arm 138 therefore rock approximately in unison about the axis of the shaft 122. The pivot 134 of the bar 52 has therefore only a slight motion if any at all, and the bar 52 is either left undisturbed or is moved so very little as not to bring its stop into operative position. The denomination stop corresponding to the operated denomination key is elevated and the frame 77 is rocked in accordance with the column key which is operated. This operation is shown in Fig. 11 of the drawings where one of the denomination keys and the first column key 87 are shown simultaneously depressed. When one of the denomination keys other than that for the decimal point is operated without operating a column key, the universal bar 128 is elevated. As the pin 142 is normally at the bottom of the slot 143, the lever 135 cannot rock about its pivot 141 when the pin 136 is raised by the universal bar 128. Consequently, when this universal bar is operated the arm 138 is rocked upward by the floating lever 135, rocking the shaft 122 and releasing the carriage. The plunger bar 51 corresponding to the operated key, is elevated, but the bar 52 is not.

It will be perceived that the left-hand one of the denomination stops is adapted to be operated by the corresponding denomination key; that said stop is adapted to be operated by any of the column keys when said column key is depressed alone, and that when a denomination key other than the one corresponding to the left-hand denomination stop is depressed, said left-hand denomination stop is maintained out of operation whether a column key be operated at the same time or not. It will also be perceived that the carriage releasing mechanism is operated by any of the denomination keys and by any of the column keys whether said keys be operated singly or jointly.

The stop pieces 43, 44, 45 and 46 may be regarded as carriers and the projections 47, 48 may be regarded as the column stops arranged at different points fore and aft of the machine along said carriers. The stops 47 form a row; and, in case eight stop carriers, for example, be employed in the machine, two of said carriers would have stops 48 arranged in a row, and the several rows of stops would be out of line with one another. The guide 73 for the denomination stops, is adjustable to bring said denomination stops into line with any selected row of column stops, each row extending parallel with the rack 40.

Various changes may be made without departing from the spirit and scope of my invention.

What I claim as new and desire to secure by Letters Patent, is:—

1. In a typewriting machine and in column selecting mechanism, the combination with a carriage, of a series of separately adjustable column stops having stop portions out of line with each other, a coöperating stop, means for normally maintaining said coöperating stop in a middle position, a series of column selecting keys, and means operated by said keys for moving said coöperating stop in different directions from its normal middle position for coöperation with one or another of said column stops.

2. In a typewriting machine and in column selecting mechanism, the combination with a carriage, of a series of separately adjustable column stops having stop portions out of line with one another and also having centrally disposed stop portions all in line, a coöperating stop, means for normally maintaining said coöperating stop in a middle position, a series of column selecting keys, means operated by said keys for moving said coöperating stop in different directions from its normal middle position for coöperation with one or another of said column stops, and means for projecting said coöperating stop into line with said centrally disposed stop portions.

3. In a typewriting machine and in column selecting mechanism, the combination with a carriage, of a series of column stops having stop surfaces out of line with one another, a key-controlled stop for coöperation with said column stops, means for moving said key-controlled stop to an operative position, a guide for said key-controlled stop, and means for moving said guide in different directions from its normal position to bring said stop into coöperation with one or another of said stop surfaces.

4. In a typewriting machine and in column selecting mechanism, the combination with a carriage, of a series of column stops having stop surfaces out of line with one another, a coöperating stop, means for effecting a relative adjustment of said coöperating stop and said series of column stops to select the particular column stop to be engaged by said coöperating stop, the extent of the adjustment being less than the width of the series of column stops, and means for moving said coöperating stop into an operative position.

5. In a typewriting machine and in tabulating mechanism, the combination with a carriage, of a series of column stops, each having a stop lug 47, said stop lugs 47 being in line with one another, and each of said column stops also having a stop lug 48, said stop lugs 48 being out of line with one another, a series of separately operable denomination stops, means for projecting any of said denomination stops into line with said lugs 47, and means for projecting any of said denomination stops into line with either of said lugs 48.

6. In a typewriting machine and in column selecting mechanism, the combination with a carriage, of a series of column stops, a pivoted frame, a series of column selecting keys, cams operated by said keys and moving said frame about its pivot to different positions, a stop or stops controlled by said pivoted frame, and means for moving the last mentioned stop or stops into the path of one of said column stops.

7. In a typewriting machine and in column selecting mechanism, the combination with a carriage, of a series of column stops having stop surfaces out of line with one another, a series of column keys, a series of cams, one operated by each of said keys, a frame adapted to be moved to different positions by said cams, a coöperating stop controlled by said frame, and means for moving said stop into the path of one of said column stops.

8. In a typewriting machine and in column selecting mechanism, the combination with a carriage, of a series of column stops having stop surfaces out of line with one another, a frame movable to different positions on opposite sides of its normal position, a series of column keys, a series of devices controlled respectively by said keys for moving said frame to different positions, a device for restoring said frame to its normal position, means whereby any of said keys frees said frame from said restoring device, a stop controlled by said frame, and means for moving said stop into the path of one of said column stops.

9. In a typewriting machine and in column selecting mechanism, the combination with a carriage, of a series of column stops having stop surfaces out of line with one another, a pivoted frame having an arm, a series of column key levers each formed with a cam adapted to engage said arm and to move it to a predetermined position, a universal lever having a cam for restoring said arm to normal position, means whereby any of said key levers operates said universal bar to free said arm, a stop controlled by said frame, and means for moving said stop into the path of one of said column stops.

10. In a typewriting machine and in tabulating mechanism, the combination with a carriage, of a series of column stops having stop surfaces out of line with one another, a coöperating stop, a guide for said coöperating stop, means for moving said guide in one direction transverse to the direction of carriage feed to bring said coöperating stop into register with one or another of said column stops, and means for moving said coöperating stop in another direction transverse to the direction of carriage feed to bring said coöperating stop into the path of one of said column stops.

11. In a typewriting machine and in tabulating mechanism, the combination with a carriage, of a series of column stops having contact faces out of line with one another, a coöperating stop, a guide for said coöperating stop, a series of column keys, means operated by the different column keys for moving said guide in one direction transverse to the direction of carriage feed to bring said coöperating stop into register with one or another of said column stops, and means operated by any of said column keys for projecting said coöperating stop in another direction transverse to the direction of carriage feed to move said coöperating stop into the path of a column stop.

12. In a typewriting machine and in tabulating mechanism, the combination with a carriage, of a series of column stops, a series of independently operable denomination stops for coöperation with said column stops, a special stop for coöperation with said column stops, a series of column selecting keys, means whereby any one of said column selecting keys moves said special stop to operative position, a series of denomination keys one connected with each of said denomination stops, and means operated by said denomination keys for rendering said column keys inoperative to move said special stop to operative position.

13. In a typewriting machine and in tabulating mechanism, the combination with a carriage, of a series of column stops, a series of key controlled stops including a special stop, hand operated devices for moving said special stop into the path of one of said column stops, a series of denomination keys for operating said series of key controlled stops, and means whereby when any of said keys is depressed said hand operated column selecting devices are rendered inoperative to move said special stop to operative position.

14. In a typewriting machine and in tabulating mechanism, the combination with a carriage and column stops, of a series of independently operable stops, a special key-operated stop, a series of denomination keys connected with said independently operable stops, a series of column selecting keys, a floating lever connected with said special stop, means operated by any of said column selecting keys for rocking said floating lever about one center to project said special stop into operative position, and means operated by said denomination keys for rocking said lever about another center whereby said special stop is prevented from moving to operative position.

15. In a typewriting machine and in tabulating mechanism, the combination with a carriage and column stops, of a series of column keys, a series of denomination keys, a series of denomination stops connected with said denomination keys, a universal bar for said column keys, a universal bar for said denomination keys, connections between said universal bars, a special stop connected with said connections, said connections including means whereby the universal bar for the column keys projects said special stop into operative position, and means whereby the universal bar for the denomination keys prevents said special stop from moving to operative position.

16. In a typewriting machine and in tabulating mechanism, the combination with a carriage and column stops, of a series of column keys, a carriage release device operated by any of said column keys, a series of denomination keys, a universal bar for said denomination keys, a lifter connected with said carriage release device, a floating lever pivoted to said lifter and to said universal bar, a special stop pivotally connected with said floating lever, the construction and arrangement being such that when a column key is depressed alone said lifter rocks said floating lever about its pivotal connection with said universal bar as a center and moves said special stop to operative position and when a denomination key is operated said universal bar operates said lifter through said floating lever and thus operates the carriage release device without moving said special stop to operative position.

17. In a typewriting machine and in tabulating mechanism, the combination of a series of tabulator keys arranged in a row at the side of the keyboard, a series of levers pivoted side by side and connected with said keys, a universal lever pivoted by the side of said key levers and having a part 99 in position to be operated by any of said key levers, and tabulating mechanism operated by said key levers.

18. In a typewriting machine and in tabulating mechanism, the combination with a carriage and column stops having stop surfaces out of line with one another, of a series of denomination stop bars, a series of key levers to which said stop bars are respectively pivoted, a guide for the free ends of said stop bars, and column selecting mechanism for moving said guide to different positions to bring said series of denomination stops into position for projection into the path of one or another of said column stops.

19. In a typewriting machine and in tabulating mechanism, the combination with a carriage, of a series of column stops, a series of column keys, a stop operable by any of said column keys and coöperating with said column stops, a series of separately operable denomination stops for coöperation with said column stops, a series of denomination keys, each connected with one of said denomination stops, and means operated by said denomination keys for rendering the first mentioned coöperating stop inoperable by the column keys.

20. In a typewriting machine and in tabulating mechanism, the combination with a carriage, of a series of column stops, a series of column keys, a stop operable by any of said column keys and coöperating with said column stops, a series of separately operable denomination stops for coöperation with said column stops, a series of denomination keys, each connected with one of said denomination stops, means operated by said denomination keys for rendering the first mentioned coöperating stop inoperable by the column keys, and an additional denomination key for operating the first mentioned coöperating stop independently of the column keys.

21. In a typewriting machine and in column selecting mechanism, the combination with a carriage, of a series of column stops having stop surfaces out of line with one another, a key-controlled stop for coöperation with said column stops, an adjustable guide for said key-controlled stop, key-controlled means for moving said guide from its normal position to different set positions corresponding to the different stop surfaces, and key-controlled means for moving said stop relatively to its guide to bring said stop into the path of the selected stop surfaces.

22. In a typewriting machine and in tabulating mechanism, the combination with a carriage, of a series of column stops each independently adjustable to different letter space positions and having contact surfaces differently disposed, a series of separately operable denomination stops, means for effecting a relative movement between the entire series of denomination stops and the entire series of column stops to bring said denomination stops into line with any selected one of said contact faces, and means for operating any one of said denomination stops, whereby the carriage may be arrested at a selected denominational position in a selected column.

23. In a typewriting machine and in tabulating mechanism, the combination with a carriage, of a series of column stops mounted on said carriage and having contact surfaces differently disposed and each independently adjustable, a frame, a series of separately operable denomination stops guided by said frame, means for operating any one of said denomination stops, and means for adjusting said frame to bring the operated denomination stop into line with a selected one of said contact surfaces.

24. In a typewriting machine and in tabulating mechanism, the combination with a carriage and column stops, of a gang of separately operable denomination stops, tabulator keys for operating said denomination stops, and hand operated means for moving said gang of stops as an entirety to different set positions to enable any of said denomination stops to co-act with different column stops.

25. In a typewriting machine and in tabulating mechanism, the combination with a carriage and column stops, of a gang of separately operable denomination stops, a guide for said denomination stops, and hand-operated means for adjusting said guide to different positions to enable any of said denomination stops to co-act with different column stops.

26. In a typewriting machine and in tabulating mechanism, the combination with a carriage and column stops, of a gang of separately operable denomination stops, keys for operating any one of said denomination stops, and a key for moving said gang of stops as an entirety to different positions to enable any of said denomination stops to co-act with different column stops.

27. In a typewriting machine and in tabulating mechanism, the combination with a carriage and column stops, of a gang of separately operable denomination stops, keys for operating said denomination stops, and a series of keys for moving said gang of denomination stops as an entirety from normal position to any one of a plurality of different adjusted positions.

28. In a typewriting machine and in tabulating mechanism, the combination with a carriage, of a series of column stops, each independently adjustable to different letter-space positions, a series of separately operable denomination stops, keys for operating said denomination stops one at a time, and keys for effecting a relative adjustment between said series of denomination stops and said series of column stops.

29. In a tabulating mechanism, the combination of a series of carriers, a rack therefor, column-stops upon said carriers at different points therealong, so that certain stops are out of line with others, a set of key-operated denomination stops, and a guide for said denomination stops, said guide being adjustable to bring the denomination stops into line with any selected column stops.

30. In a tabulating mechanism, the combination of a series of carriers, a rack therefor, column stops upon said carriers at different points therealong, a certain set of said stops forming one row which is out of line with another set of said stops forming another row, a set of key-operated denomination stops, and a guide for said denomination stops, said guide being adjustable to bring the denomination stops into line with any selected row of column stops, each row extending parallel with said rack.

31. In a tabulating mechanism, the combination with a series of key-operated denomination stops, of means for adjusting said series to different positions and holding them there, a series of carriers, a rack therefor, column stops upon said carriers at different points therealong, a second set of said stops forming one row, which is out of line with another set of said stops forming another row, said rows in positions to correspond to the different positions to which the denomination stops may be adjusted, each row extending parallel with said rack, and said denomination stops formed upon the tops of rods which are loosely connected at their lower ends to key-operated devices.

Signed at Syracuse, in the county of Onondaga, and State of New York, this 26th day of March A. D. 1908.

HANNIBAL C. FORD.

Witnesses:
H. I. SEDDON,
H. A. JOHNSTONE.